US009760712B2

(12) United States Patent
Feroz et al.

(10) Patent No.: US 9,760,712 B2
(45) Date of Patent: Sep. 12, 2017

(54) APPLICATION WHITELISTING USING USER IDENTIFICATION

(71) Applicant: VMware, Inc., Palo Alto, CA (US)

(72) Inventors: Azeem Feroz, San Jose, CA (US);
Binyuan Chen, Belmont, CA (US);
Prasad Sharad Dabak, Maharashtra (IN)

(73) Assignee: VMware, Inc., Palo Alto, CA (US)

( * ) Notice: Subject to any disclaimer, the term of this patent is extended or adjusted under 35 U.S.C. 154(b) by 100 days.

(21) Appl. No.: 14/286,010

(22) Filed: May 23, 2014

(65) Prior Publication Data
US 2015/0339475 A1 Nov. 26, 2015

(51) Int. Cl.
H04L 29/06 (2006.01)
G06F 21/53 (2013.01)
G06F 21/56 (2013.01)

(52) U.S. Cl.
CPC ............ G06F 21/53 (2013.01); G06F 21/566 (2013.01)

(58) Field of Classification Search
CPC ....... G06F 21/53; G06F 21/552; G06F 21/577
See application file for complete search history.

(56) References Cited

U.S. PATENT DOCUMENTS

| 7,698,744 B2* | 4/2010 | Fanton et al. ................ 726/27 |
| 7,797,748 B2 | 9/2010 | Zheng et al. |
| 7,984,304 B1 | 7/2011 | Waldspurger et al. |
| 8,079,030 B1* | 12/2011 | Satish .................... H04L 63/14 713/164 |
| 8,250,519 B2 | 8/2012 | Budko et al. |
| 8,286,241 B1* | 10/2012 | Yeo et al. ..................... 726/22 |
| 8,402,441 B2 | 3/2013 | Budko et al. |
| 8,694,738 B2* | 4/2014 | Bhattacharjee et al. ...... 711/151 |
| 8,813,230 B2* | 8/2014 | Fanton et al. ................... 726/24 |
| 8,856,782 B2* | 10/2014 | Ghosh ................. G06F 9/45533 718/1 |
| 8,973,144 B2* | 3/2015 | Dang et al. .................... 726/24 |
| 9,075,984 B2* | 7/2015 | Fanton et al. |
| 2005/0060566 A1* | 3/2005 | Chebolu et al. .............. 713/200 |
| 2005/0060581 A1* | 3/2005 | Chebolu et al. .............. 713/201 |
| 2005/0065935 A1* | 3/2005 | Chebolu et al. ................. 707/9 |
| 2006/0150256 A1* | 7/2006 | Fanton et al. .................. 726/27 |
| 2008/0183996 A1* | 7/2008 | Field ...................... G06F 9/468 711/163 |
| 2011/0087692 A1* | 4/2011 | Masone ....................... 707/769 |
| 2011/0219447 A1* | 9/2011 | Horovitz et al. .............. 726/22 |
| 2012/0209923 A1* | 8/2012 | Mathur et al. ................ 709/206 |
| 2012/0291126 A1* | 11/2012 | Lagar-Cavilla et al. ....... 726/22 |
| 2013/0031291 A1* | 1/2013 | Edwards .............. G06F 21/554 711/6 |

(Continued)

Primary Examiner — Sharon Lynch

(57) ABSTRACT

Methods and systems for protecting a virtual machine network are disclosed. In an embodiment, a method involves storing an application whitelist including application-to-user associations in memory such that the application whitelist is immutable by a guest virtual machine, receiving a request to execute an application including an application identifier and a user identifier, comparing the application identifier and the user identifier of the request with the application whitelist, and generating an execution decision indicating whether the requested application can execute on the guest virtual machine.

24 Claims, 7 Drawing Sheets

(56) References Cited

U.S. PATENT DOCUMENTS

| | | | |
|---|---|---|---|
| 2013/0054948 A1* | 2/2013 | Raj | G06F 9/45558 713/2 |
| 2013/0074186 A1* | 3/2013 | Muttik | 726/24 |
| 2013/0091318 A1* | 4/2013 | Bhattacharjee | G06F 12/1475 711/6 |
| 2013/0097355 A1* | 4/2013 | Dang et al. | 711/6 |
| 2013/0097356 A1* | 4/2013 | Dang | G06F 9/455 711/6 |
| 2013/0097660 A1* | 4/2013 | Das et al. | 726/1 |
| 2013/0145463 A1* | 6/2013 | Ghosh | G06F 21/56 726/22 |
| 2013/0191924 A1* | 7/2013 | Tedesco et al. | 726/26 |
| 2013/0318594 A1* | 11/2013 | Hoy et al. | 726/15 |
| 2013/0347131 A1* | 12/2013 | Mooring et al. | 726/29 |
| 2014/0025903 A1* | 1/2014 | Yamashita | G06F 21/78 711/152 |
| 2014/0090077 A1* | 3/2014 | Jeong et al. | 726/26 |
| 2014/0189683 A1* | 7/2014 | Bing | G06F 9/45533 718/1 |
| 2014/0215226 A1 | 7/2014 | Litty et al. | |
| 2014/0223543 A1* | 8/2014 | Jeansonne | G06F 21/53 726/16 |
| 2014/0359270 A1* | 12/2014 | Raj et al. | 713/2 |
| 2015/0007326 A1* | 1/2015 | Mooring et al. | 726/24 |
| 2015/0040246 A1* | 2/2015 | Yuen et al. | 726/30 |
| 2015/0089497 A1* | 3/2015 | Borzycki et al. | 718/1 |
| 2015/0212842 A1* | 7/2015 | Ghosh | G06F 9/45533 718/1 |
| 2015/0213264 A1* | 7/2015 | Mooring et al. | 726/24 |
| 2015/0234718 A1* | 8/2015 | Dang | G06F 11/1484 711/133 |
| 2015/0317178 A1* | 11/2015 | Dang | G06F 9/455 718/1 |
| 2015/0318986 A1* | 11/2015 | Novak | H04L 63/0428 713/189 |
| 2015/0319160 A1* | 11/2015 | Ferguson | H04L 63/0428 726/10 |
| 2016/0134636 A1* | 5/2016 | Raghuram | G06F 21/57 726/4 |
| 2016/0357988 A1* | 12/2016 | Ferguson | H04L 63/0428 |

* cited by examiner

APPLICATION WHITELISTING USING USER IDENTIFICATION

BACKGROUND

With the prevalence of Software Defined Data Centers (SDDCs) cyber-attackers have expanded the attack scope from a single target device in a SDDC (e.g., a host, virtual machine, storage array, or hypervisor) to all devices in the SDDC. The expanded attack scope may cause many enterprise and even national security issues. One of the more prevalent expanded-attack-scope strategies is Advanced Persistent Threat (APT).

Compared to traditional simple attack strategies that typically involve specific, one-shot malicious tasks, APT is more sophisticated and more difficult to combat. Attackers behind APT have a full spectrum of intelligence-gathering techniques at their disposal such as, for example, using social engineering to deliver malware to vulnerable SDDC assets. Once the malware has been delivered to vulnerable SDDCs, attackers stay "low and slow" to avoid detection, but continuously monitor and interact with the system to achieve malicious objectives. When faced with APT, traditional security approaches may not be sufficient to protect an SDDC.

One approach to combating APT attacks is Blacklisting. Blacklisting involves comparing every application execution request to a database of signatures describing the binary of "bad" applications or their runtime behaviors in memory and, if the application to be executed matches an entry in the database, preventing the application from being executed. However, the effectiveness of blacklisting solutions, such as anti-malware solutions, in combating APT attacks is limited by the rapid growth of the "bad" software population. For example, by one account, during the 10 years from 2002 to 2012, the volume of "known-good" executable code has roughly doubled from 17 million to 40 million, while the amount of "known-bad" malware has increased 40 times from 2 million to over 80 million.

The rapid growth of APT and the inefficiency of traditional blacklisting solutions have prompted security administrators to shift focus from denying the known-bad applications (i.e., traditional blacklisting) to allowing only the known good applications (i.e., application whitelisting). Application whitelisting prevents an application from executing unless it matches an entry in the whitelist and has been found to be effective in combatting APT. However, it can be difficult to maintain per-virtual machine whitelists in large SDDCs.

BRIEF DESCRIPTION OF THE DRAWINGS

Throughout the description, similar reference numbers may be used to identify similar elements.

DETAILED DESCRIPTION

It will be readily understood that the components of the embodiments as generally described herein and illustrated in the appended figures could be arranged and designed in a wide variety of different configurations. Thus, the following more detailed description of various embodiments, as represented in the figures, is not intended to limit the scope of the present disclosure, but is merely representative of various embodiments. While the various aspects of the embodiments are presented in drawings, the drawings are not necessarily drawn to scale unless specifically indicated.

The present invention may be embodied in other specific forms without departing from its spirit or essential characteristics. The described embodiments are to be considered in all respects only as illustrative and not restrictive. The scope of the invention is, therefore, indicated by the appended claims rather than by this detailed description. All changes which come within the meaning and range of equivalency of the claims are to be embraced within their scope.

Reference throughout this specification to features, advantages, or similar language does not imply that all of the features and advantages that may be realized with the present invention should be or are in any single embodiment of the invention. Rather, language referring to the features and advantages is understood to mean that a specific feature, advantage, or characteristic described in connection with an embodiment is included in at least one embodiment of the present invention. Thus, discussions of the features and advantages, and similar language, throughout this specification may, but do not necessarily, refer to the same embodiment.

Furthermore, the described features, advantages, and characteristics of the invention may be combined in any suitable manner in one or more embodiments. One skilled in the relevant art will recognize, in light of the description herein, that the invention can be practiced without one or more of the specific features or advantages of a particular embodiment. In other instances, additional features and advantages may be recognized in certain embodiments that may not be present in all embodiments of the invention.

Reference throughout this specification to "one embodiment," "an embodiment," or similar language means that a particular feature, structure, or characteristic described in connection with the indicated embodiment is included in at least one embodiment of the present invention. Thus, the phrases "in one embodiment," "in an embodiment," and similar language throughout this specification may, but do not necessarily, all refer to the same embodiment.

Figure 1:
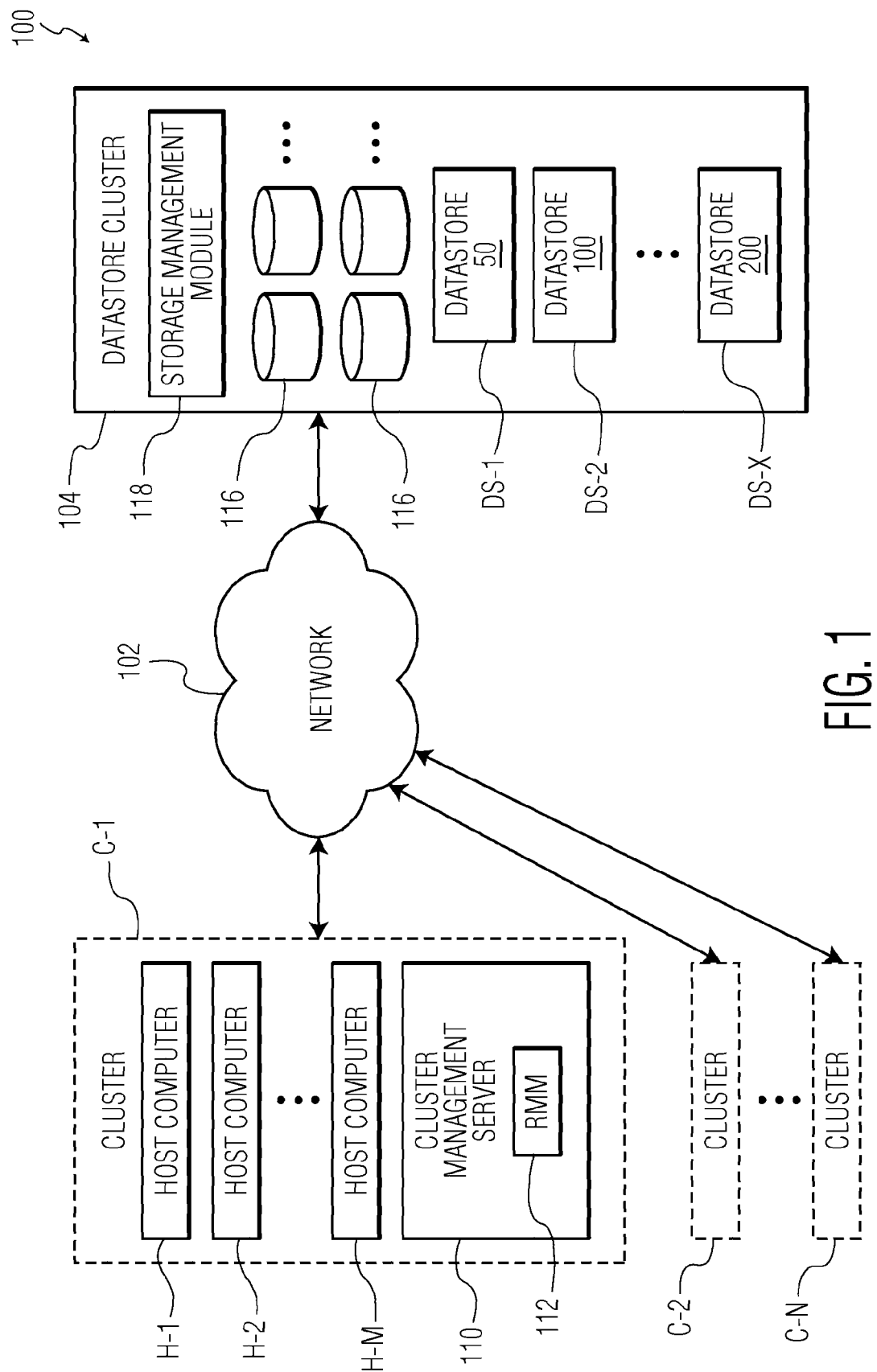
FIG. 1 is a block diagram of a virtual machine network.

Turning now to FIG. 1, a block diagram of a virtual machine network (VM network) is shown. The VM network includes a network 102, clusters C-1, C-2 . . . C-N (where N is a positive integer) of host computers, and a datastore cluster 104. The exact number of host computer clusters included in the distributed computer system can be, for example, from a few clusters to tens of clusters or more. The host computers of the different clusters and the datastore cluster are connected to the network. Thus, each of the host computers in the clusters is able to access the datastore cluster via the network and may share the resources provided by the datastore cluster with the other host computers. Consequently, any process running on any of the host computers may also access the datastore cluster via the network.

In the illustrated embodiment, each of the clusters C-1, C-2 . . . C-N includes a number of host computers H-1, H-2 . . . H-M (where M is a positive integer) and a cluster management server 110. The number of host computers included in each of the clusters can be any number from, for example, one to several hundred or more. In addition, the number of host computers included in each of the clusters can vary so that different clusters can have a different number of host computers. While at least some of the host computers may be virtualized, in the embodiment of FIG. 1, the host computers are physical computer systems that host or support one or more VMs so that the VMs are executing on the physical computer systems. The host computers may be servers that are commonly found in data centers. As an example, the host computers may be servers installed in one or more server racks. Typically, the host computers of a cluster are located within the same server rack.

Each of the cluster management servers 110 in the clusters C-1, C-2 . . . C-N operates to monitor and manage the host computers H-1, H-2 . . . H-M in the respective cluster. Each cluster management server may be configured to monitor the current configurations of the host computers and the VMs running on the host computers, for example, virtual machines (VMs), in the respective cluster. The monitored configurations may include the hardware configuration of each of the host computers, such as CPU type and memory size, and/or software configurations of each of the host computers, such as operating system (OS) type and installed applications or software programs. The monitored configurations may also include VM hosting information, i.e., which VMs are hosted and running on which host computers. The monitored configurations may also include VM information. The VM information may include the size of each of the VMs, virtualized hardware configurations for each of the VMs, such as virtual CPU type and virtual memory size, software configurations for each of the VMs, such as OS type and installed applications or software programs running on each of the VMs, and virtual storage size for each of the VMs. The VM information may also include resource parameter settings, such as demand, limit, reservation and share values for various resources, e.g., CPU, memory, network bandwidth and storage, which are consumed by the VMs. The demands of the VMs for the consumable resources are determined by the host computers hosting the VMs by monitoring the current usage of resources by the VMs, e.g., CPU processing usage, memory usage, network usage and/or storage usage, and provided to the respective cluster management server.

In some embodiments, the cluster management servers 110 may be implemented on separate physical computers. In other embodiments, the cluster management servers may be implemented as software programs running on the host computer 200 shown in FIG. 2, or virtual computers, such as VM 220-1, 220-2 . . . 220-L. In an implementation, the cluster management servers are VMware vCenter™ servers with at least some of the features available for such servers and each resource management module (RMM) 112 is a VMware Distributed Resource Scheduler™, which provides a Distributed Resource Scheduler (DRS) service as is known in the field.

The network 102 can be any type of computer network or a combination of networks that allows communications between devices connected to the network. The network 102 may include the Internet, a wide area network (WAN), a local area network (LAN), a storage area network (SAN), a fibre channel network and/or other networks. The network 102 may be configured to support protocols suited for communications with storage arrays, such as Fibre Channel, Internet Small Computer System Interface (iSCSI), Fibre Channel over Ethernet (FCoE) and HyperSCSI.

The datastore cluster 104 is used to store data for the host computers of the clusters C-1, C-2 . . . C-N, which can be accessed like any other type of storage device commonly connected to computer systems. In an embodiment, the datastore cluster can be accessed by entities, such as VMs running on the host computers, using any file system, e.g., virtual machine file system (VMFS) or network file system (NFS). The datastore cluster includes one or more computer data storage devices 116, which can be any type of storage devices, such as solid-state devices (SSDs), hard disks or a combination of the two. At least some of these storage devices may be local storage devices of the host computers, e.g., locally attached disks or SSDs within the host computers. The storage devices may operate as components of a network-attached storage (NAS) and/or a storage area network (SAN). The datastore cluster includes a storage management module 118, which manages the operation of the datastore cluster. In an embodiment, the storage management module is a computer program executing on one or more computer systems (not shown) of the datastore cluster. The datastore cluster supports multiple datastores DS-1, DS-2 . . . DS-X (where X is a positive integer), which may be identified using logical unit numbers (LUNs). In an embodiment, the datastores are virtualized representations of storage facilities. Thus, each datastore may use resources from more than one storage device included in the datastore cluster. The datastores are used to store data associated with the VMs supported by the host computers of the clusters C-1, C-2 . . . C-N. For virtual machines, the datastores may be used as virtual storage or virtual disks to store files needed by the virtual machines for operation. One or more datastores may be associated with one or more clusters. In an embodiment, the same datastore may be associated with more than one cluster.

Figure 2:
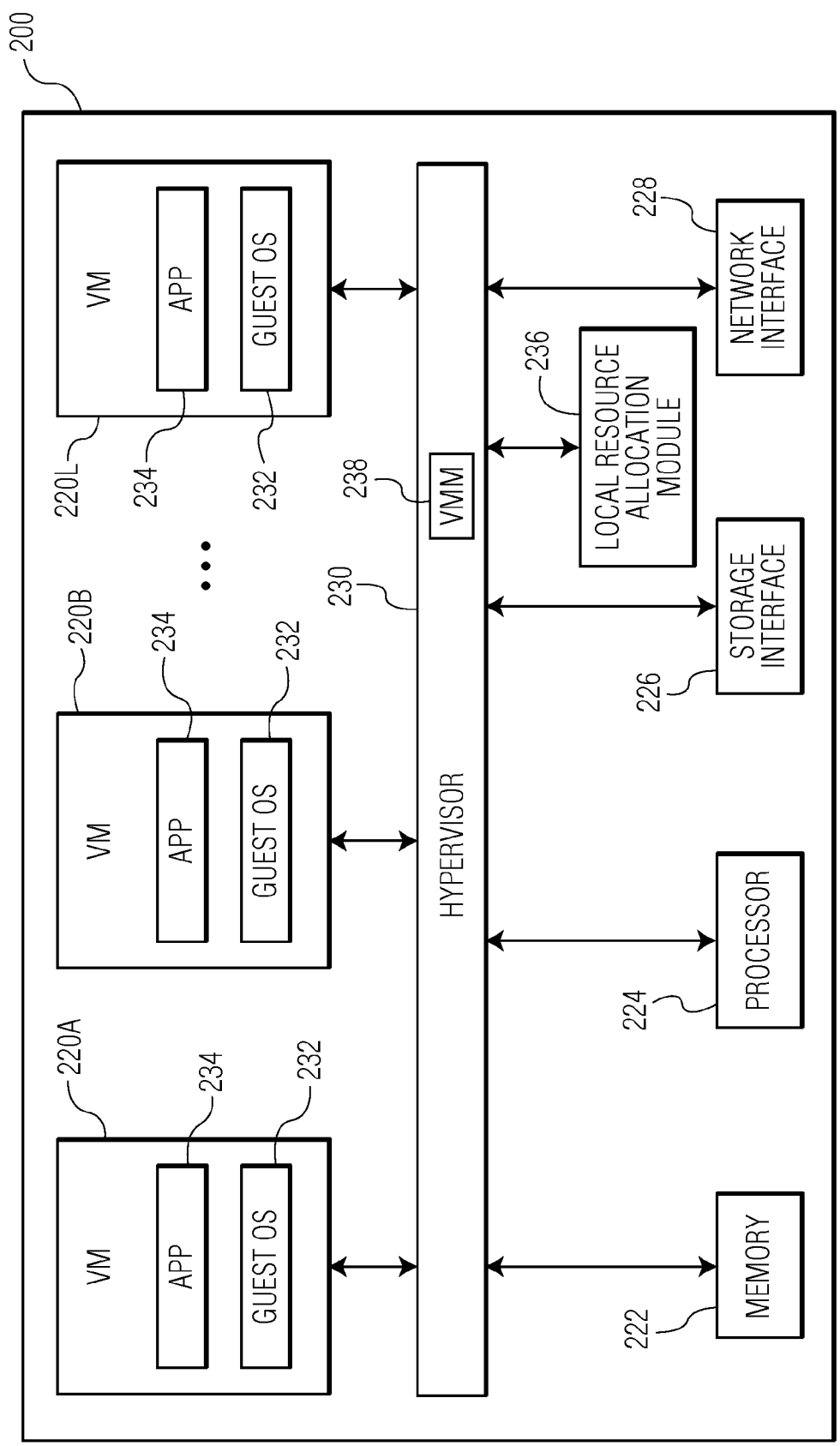
FIG. 2 is a block diagram of a host computer from the virtual machine network of FIG. 1.

Turning now to FIG. 2, components of a host computer 200 that is representative of the host computers H-1, H-2 . . . H-M, are shown. In FIG. 2, the physical connections between the various components of the host computer are not illustrated. In the illustrated embodiment, the host computer is configured to support a number of VMs 220-1, 220-2 . . . 220-L (where L is a positive integer). The number of VMs supported by the host computer can be anywhere from one to more than one hundred. The exact number of VMs supported by the host computer is limited by the physical resources of the host computer or other constraints such as licensing. The VMs share at least some of the hardware resources of the host computer, which includes system memory 222, one or more processors 224, a storage interface 226, and a network interface 228. The system memory 222, which may be random access memory (RAM), is the primary memory of the host computer. The processor 224 can be any type of processor, such as a central processing unit (CPU) commonly found in a server. The storage interface 226 is an interface that allows the host computer to communicate with the datastore cluster 104 in FIG. 1. As an example, the storage interface may be a host bus adapter or a network file system interface. The network interface 228 is an interface that allows the host computer to communicate with other devices in the cluster as well as devices connected to the network 102 in FIG. 1. As an example, the network interface may be a network adapter. The VMs can be configured many different ways including, for example, as guest VMs or as security VMs (SVMs). Guest VMs may include a guest operating system 232 and one or more guest applications 234. The guest operating system is a master control program of the guest VM and, among other things, forms a software platform on top of which the guest applications run. In an embodiment, guest applications are individual programs such as, for example, an email manager, a system logger, or another program with which a user directly communicates. Security VMs may also include an operating system 232 and applications 234. Security applications are programs that, for example, communicate with the server and perform encryption, but are typically limited to only communicating with other VMs and not users directly.

In the embodiment of FIG. 2, the VMs 220A, 220B . . . 220L run on top of a hypervisor 230 that includes a kernel (not shown) and a virtual machine monitor (VMM) 238. In the embodiment of FIG. 2, the VMM is a software interface layer that enables sharing of the hardware resources of the host computer 200 by the VMs. However, in other embodiments, one or more of the VMs can be nested, i.e., a VM running in another VM. For example, one of the VMs may be running in a VM, which is also running in another VM. The virtual machine monitor may run on top of the host computer's operating system or directly on hardware of the host computer. In some embodiments, the virtual machine monitor runs on top of a hypervisor that is installed on top of the hardware components of the host computer. With the support of the virtual machine monitor, the VMs provide virtualized computer systems that give the appearance of being distinct from the host computer and from each other.

Similar to any other computer system connected to the network 102 in FIG. 1, the VMs 220A, 220B . . . 220L shown in FIG. 2 are able to communicate with other computer systems connected to the network using the network interface 228 of the host computer 200. In addition, the VMs are able to access the datastore cluster 104 in FIG. 1 using the storage interface 226 of FIG. 2 of the host computer.

The host computer 200 also includes a local resource allocation module 236 that operates as part of a resource management system, such as a distributed resource scheduler system, to manage resources consumed by the VMs 220A, 220B . . . 220L. The local resource allocation module in each host computer cooperatively operates with the local resource allocation modules in the other host computers of the network computer system 100 to generate resource allocation settings and perform resource scheduling, which includes balancing the loads of software processes and/or storage resource scheduling, among the host computers H-1, H-2 . . . H-M of the host computer clusters C-1, C-2 . . . C-N. Although the local resource allocation module is illustrated in FIG. 2 as being separate from the virtual machine monitor 230, the local resource allocation module may be implemented as part of the virtual machine monitor. In some embodiments, the local resource allocation module is implemented as software programs running on the host computer. However, in other embodiments, the local resource allocation module may be implemented using any combination of software and hardware.

The VM network and host computer described above with reference to FIGS. 1 and 2 can be used to implement a software defined data center (SDDC). Because VM networks (e.g., implemented as an SDDC) typically share common resources (e.g., memory or CPUs), if, for example, one of the guest VMs becomes compromised, other VMs on the host and in the SDDC could become vulnerable or compromised as well. In order to prevent VMs from becoming compromised, an application whitelist can be used to prevent certain applications from being executed on guest VMs in the VM network. In an embodiment, the application whitelist can further associate a user with applications that the user is permitted to execute. Thus, only specified applications can be executed by specified users.

However, if a guest VM does become compromised by an attacker, the guest VM could be vulnerable to the attacker hijacking the guest VM and modifying the application whitelist to allow undesirable applications to be executed on the guest VM. To protect an application whitelist from being hijacked if a guest VM becomes compromised, in an embodiment, the application whitelist is configured to be immutable by the guest VM. For example, the application whitelist used by a guest VM is stored in memory that is allocated to another VM and is inaccessible to read or write requests of the guest VM, thereby making the application whitelist immutable by the guest VM. When a request to execute an application is made by the guest VM, the request can be sent to the other VM and compared with the application whitelist. Thus, should the guest VM become compromised, an attacker will not be able to modify the application whitelist because the application whitelist is immutable by the guest VM.

In addition to preventing an application whitelist from being hijacked and modified by an attacker, in an embodiment, storing an application whitelist in a separate VM allows application whitelist comparisons to be performed using a centralized application whitelist. Using a centralized application whitelist allows the same application whitelist to be used for multiple guest VMs in the VM network. For example, Guest VM A and Guest VM B can both send requests to execute applications to a third centralized VM for comparison with the same application whitelist. Thus, a single application whitelist can be stored centrally on the third VM and used by each guest VM rather than storing a separate application whitelist within each guest VM. In an alternate embodiment, multiple different application whitelists can be generated and stored centrally. A central controller can then distribute different application whitelists to each application whitelist service, allowing VMs to use different application whitelists while still utilizing a centralized management approach.

Figure 3:
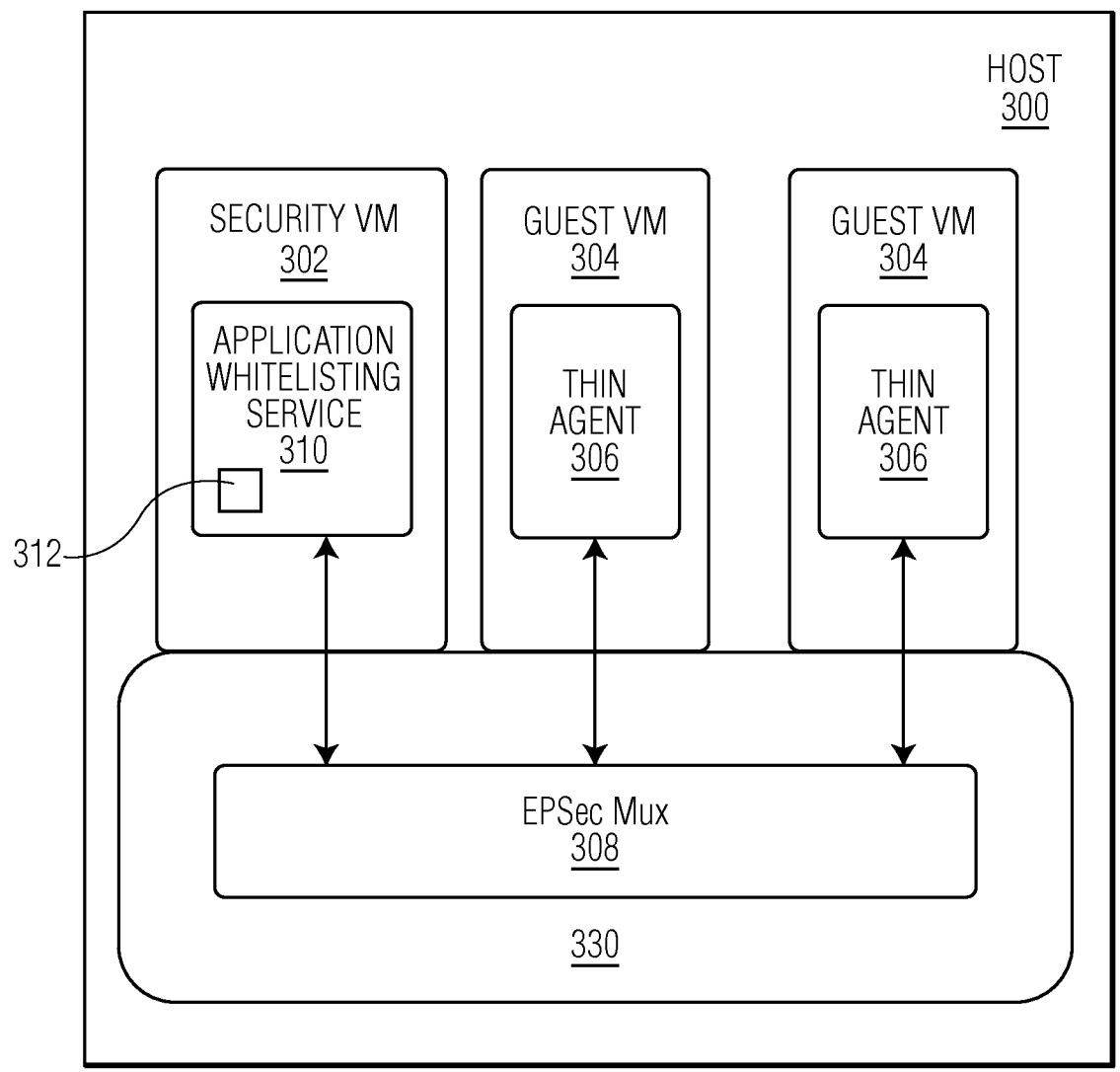
FIG. 3 depicts an embodiment of a host in a SDDC that includes an application whitelisting service and an application whitelist in accordance with an embodiment of the invention.
Figure 4:
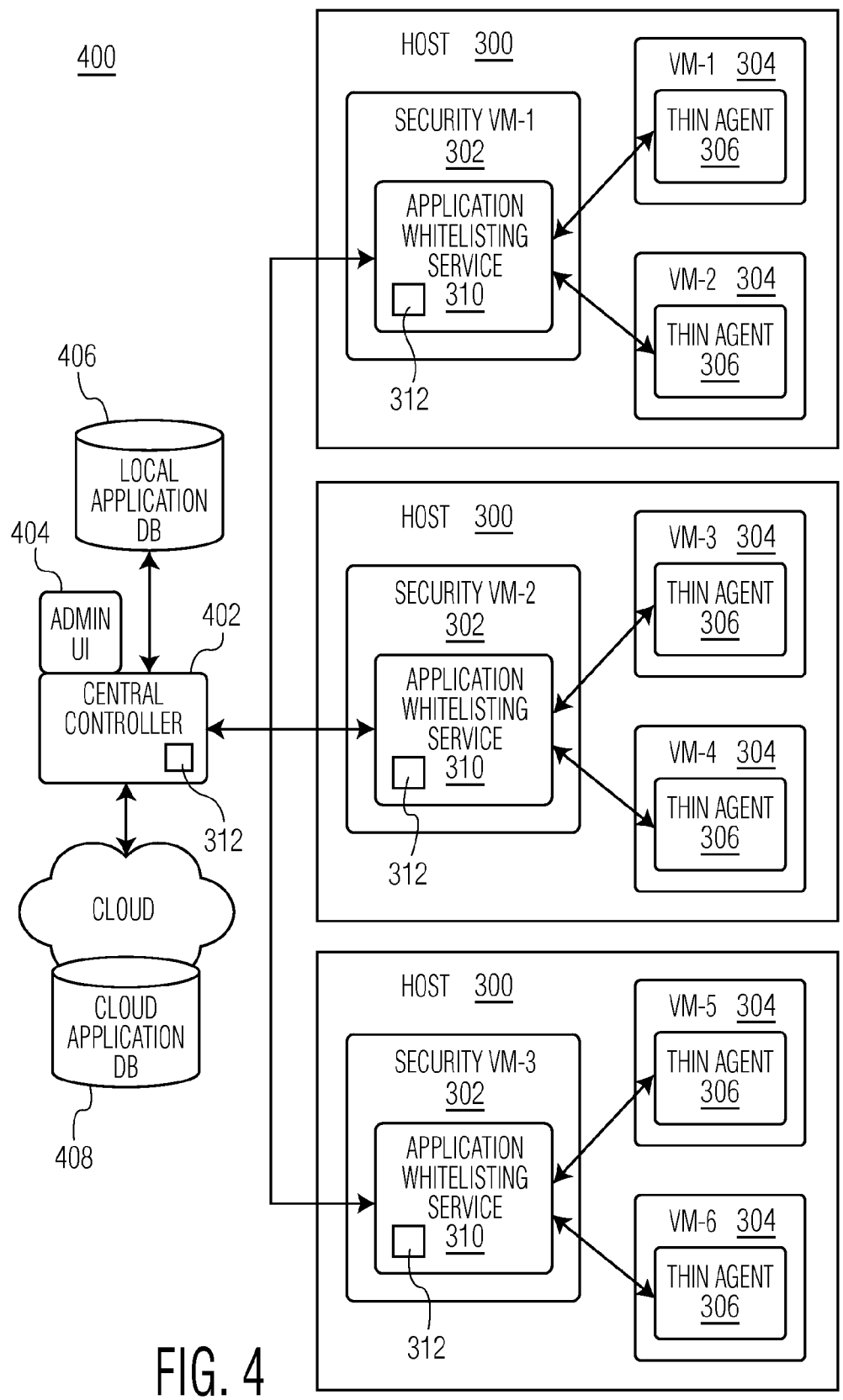
FIG. 4 depicts an embodiment of an SDDC that includes application whitelisting services, application whitelists, and a central controller in accordance with an embodiment of the invention.

In an embodiment, host computers and VM networks are further configured, as depicted in FIGS. 3 and 4, to support centralized and external application whitelists using application-to-user identification associations. FIG. 3 depicts a configuration of a host 300 in a SDDC that includes a security VM 302, guest VMs 304, and a hypervisor 330 in accordance with an embodiment of the invention. In the embodiment of FIG. 3, the hypervisor further includes an end-point security multiplexer (EPSec Mux) 308, through which the guest VMs can communicate with the security VM. The security VM includes an application whitelisting service 310 that compares requests to execute applications on guest VMs with an application whitelist 312 and the guest VMs include thin agents 306 that perform various management functions.

In operation, the thin agents 306 run on guest VMs 304 and intercept user-generated requests to execute applications and forward the intercepted requests to the application whitelisting service 310 running on a corresponding security VM 302. The application whitelisting service forwards requests received from the thin agents along to a central controller (not shown) or, once the application whitelist 312 has been generated, the application whitelisting service can utilize the application whitelist to determine if the user-generated requests should be allowed or denied. In an embodiment, application whitelists are stored outside of the guest VMs (e.g., in memory allocated to the security VM) and are configured such that they can be modified by the security VM or the central controller, but not by guest VMs (i.e., the application whitelists are immutable by the guest VMs).

FIG. 4 depicts a configuration of a virtual network 400 (e.g., implemented as a SDDC) that includes a central controller 402 having an Admin user interface (UI) 404, a local application database 406, a cloud application database 408, and multiple hosts 300 in accordance with an embodiment of the invention. In the embodiment of FIG. 4, the central controller is connected to multiple hosts. The connection to multiple hosts enables centralized management and distribution of application whitelists 312 amongst the multiple hosts. Each host supports a security VM 302 and one or more guest VMs 304 and the guest VMs each run a thin agent 306, which communicates with the application whitelisting service 310 that is running on the corresponding unified service VM. In an alternate embodiment, the central controller is connected to several hypervisors and each hypervisor is configured to manage one or more guest VMs and a security VM.

In operation, the thin agent 306 running on each guest VM 304 intercepts user-generated requests to execute applications, which applications can be stored in the local application database 406 or in the cloud application database 408. The thin agents forward the intercepted requests to the application whitelisting service running on a security VM 302 and the forwarded requests are used to generate an application whitelist. An application whitelist can be generated, for example, manually by an administrator via the admin UI 404, automatically by the central controller 402 in accordance with predefined policies as discussed further below, or by a combination of the two. Once generated, copies of the application whitelist are distributed to and stored in each security VM and used by the respective application whitelisting service 310 to determine if a user is allowed to execute a requested application. As discussed above with reference to FIG. 3, the application whitelist is stored outside of the guest VMs and is immutable by guest VMs, but can be modified by the security VM or the central controller as needed.

In the embodiment of FIGS. 3 and 4, the application whitelist 312 is generated based on user-generated requests to execute applications. For example, a user logs in to guest VM-1 (FIG. 4) and requests to execute an application. A thin agent 306 running on guest VM-1 intercepts the request and communicates the request to the corresponding security VM 302 via the EPSec Mux 308 (FIG. 3.) In an embodiment, a request contains a tuple relating an application identifier such as, for example, a filename and hash value of the requested application to a user identifier such as, for example, a user id, group id, IP address, or workstation information of the user requesting to execute the application. An example of a user ID can be an employee name or number, an example of a group ID can be the ID number for an organization department (e.g., the finance department), an example of an IP address can be an IP address assigned to a specific office building, and an example of workstation information can be information such as the operating system that the client device is running. The user identifiers included in an application whitelist can be used to limit which users can execute an application and where or by what means the application can be executed. For example, if an entry in an application whitelist includes user identifiers to associate an application with user Betty, on a PC, having an IP address assigned to the main office, then a request from Betty on a PC, having an IP address assigned to Betty's home will not match the entry in the application whitelist.

In an embodiment, an application whitelisting service 310 running on a security VM 302 processes requests to execute applications from a guest VM 304 before communicating the requests to the central controller 402. After a period of time, (e.g., once enough requests have been collected), an administrator can review the requests received by the central controller 402 via the Admin UI 404 and select the requests (i.e., tuples associating an application with a user) to include in the application whitelist 310. The application whitelist can be stored on the central controller and distributed to the desired security VMs. Because the central controller is central to the application whitelisting services, the central controller can store and distribute the same application whitelist to multiple different application whitelisting services.

In an embodiment, the central controller can automatically select requests to include in the application whitelist based on user-defined policies governing the types of requests that should be included in the application whitelist. For example, a user-defined policy can be a rule excluding requests to execute an application that attempts to modify a system file (e.g., system32 or a system registry) of the VM, but allowing requests to execute an application that attempts to modify user-generated document files (e.g., Word or notepad.) In a further embodiment, an administrator can review the requests received by the central controller via the Admin UI in combination with automatic assistance from the central controller. In a further embodiment, if the user requests to execute a trusted software updater application and the request is included in the application whitelist, the central controller can automatically include requests for files accessed or additional applications executed by the trusted software updater in the application whitelist. For example, when a user requests to execute a trusted software updater that needs to access several system files, a file access event is sent to the application whitelisting service. If the trusted software updater is added to the application whitelist, then the application whitelist service can automatically add a request to access the several system files to the application whitelist as well. Thus, any requests made by the trusted software updater to unpack or expand needed files will be in the application whitelist if the trusted software updater is in the application whitelist.

In an embodiment, enforcement of an application whitelist involves intercepting user-generated requests to execute applications, comparing the requests with an application whitelist, and determining if there is a match in the application whitelist. For example, a user logs in to one of the guest VMs 304 in a host 300 and requests to execute an application. A thin agent 306 running on the guest VM intercepts the request, blocks execution of the application, and communicates the request to the corresponding security VM 302 via the EPSec Mux 308. At the security VM, the request is compared to the stored application whitelist 312.

If a match is found, then the security VM sends a response back to the thin agent authorizing the application to continue executing and the thin agent unblocks the execution of the application. Alternatively, if no match is found, then the security VM sends an alert to the central controller 402 and a response to the thin agent via the EPSec Mux denying the request to execute the application and the thin agent terminates the request to execute the application. In an alternate embodiment, if no match is found, the security VM ignores the request and sends no further communications to the thin agent and, without further communication, the thin agent continues blocking execution of the application. In an embodiment, the alert contains information similar to the request (e.g., a tuple associating the application with a user) and the alert can be reviewed by an administrator via the Admin UI or automatically by the central controller using predefined policies. If, upon review of the alert, it is determined that the tuple received in the alert should be included in the application whitelist, then the central controller can update the application whitelist and re-distribute the updated application whitelist to the application whitelisting services. In this way, changes to the application whitelist made in response to a request on a single VM can be applied to other application whitelists that are used for other VMs in the VM network.

In an embodiment, the application whitelists can be organized by user identifier. For example, users Able, Betty, and Chuck use various VMs in a VM network and while the application whitelist is being generated, Betty signs in to VM1 and requests to execute TomCat 7. embodiment where the application whitelist associates applications with users, the thin agent on VM1 intercepts the request and passes along a request tuple associating an application identifier (e.g., name and/or hash value) with a user identifier (e.g., user name or ID.) When the application whitelisting service receives the request, the application whitelisting service will format the request into the following application whitelist entry for the application whitelisting service for VM1:

```
{Betty
    <Tomcat7.exe, c8a57f4ca413effd5897d8a20e05fc80>
}
```

Betty then signs in to VM2 and requests to execute Internet Explorer. The thin agent on VM2 intercepts the request and passes along a request tuple that is formatted into the following application whitelist entry for the application whitelisting service for VM2:

```
{Betty
    <iexplore.exe, 0685765c0cbe095ba0c6c8790bae21ef>
}
```

Chuck signs in to VM 3 and requests to execute Internet Explorer and uTorrent. The thin agent on VM3 intercepts the requests and passes along request tuples that are formatted into the following application whitelist entries for the application whitelisting service for VM3.

```
{Chuck
    <iexplore.exe, 0685765c0cbe095ba0c6c8790bae21ef>
}
{Chuck
    <utorrent.exe, d448866fb3df8950f5c14e7296e111b>
}
```

In an embodiment, an administrator then reviews the formatted requests and determines that Betty should be allowed to execute TomCat 7 as well as Internet Explorer and that Chuck, too, should be allowed to execute Internet Explorer, but should not be allowed to execute uTorrent. Accordingly, the following application whitelist can be generated and distributed to application whitelisting service 1, 2, and 3:

```
{Betty
    <Tomcat7.exe, c8a57f4ca413effd5897d8a20e05fc80>,
    <iexplore.exe, 0685765c0cbe095ba0c6c8790bae21ef>
}
{Chuck
    <iexplore.exe, 0685765c0cbe095ba0c6c8790bae21ef>
}
```

Figure 5A:
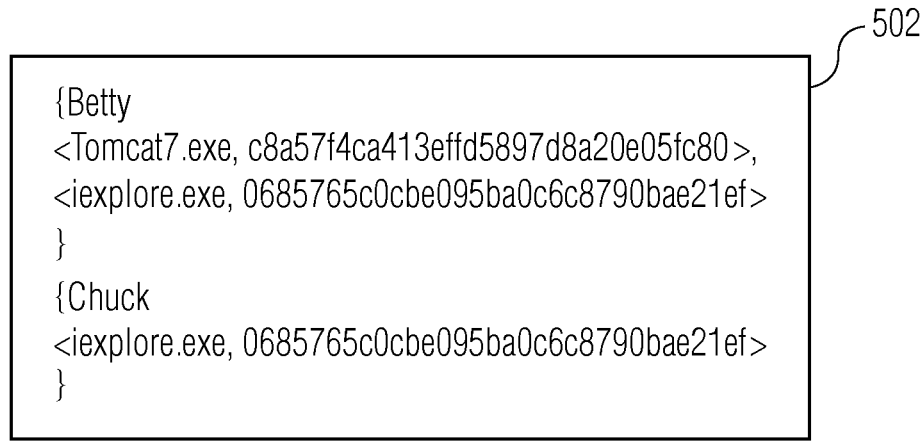
FIG. 5A depicts an application whitelist in accordance with an embodiment of the invention.

The above-described whitelist is also depicted in FIG. 5A. Note that Betty's activity on VM1 and VM2 has been combined in the resultant application whitelist 502. Thus, when the application whitelist is distributed to the different application whitelisting services, Betty can sign in to VM 1, 2, or 3 and execute either TomCat 7 or Internet Explorer because the resultant application whitelist contains a match for Betty's requests to execute TomCat 7 and Internet Explorer and the same application whitelist is used by VM 1, 2, and 3. Similarly, when Chuck logs in to VM 1, 2, or 3, he will be able to execute Internet Explorer. However, Chuck will not be able to execute uTorrent because, when the request is compared to the application whitelist, no match will be found and the thin agent on VM 1, 2, or 3 will continue to block the execution of the application. Furthermore, Able will not be able to run any applications from any VMs because Able is not included in the application whitelist.

In another embodiment, multiple different application whitelists can be generated and distributed to certain application whitelisting services to limit the VMs that a user is allowed to use to execute applications. For example, in the whitelists above, an admin might decide that Betty should not be allowed to execute any applications from VM 3 and that Chuck should not be allowed to execute any applications from VM1 or 2. Thus, two application whitelists can be generated as follows:

```
List A:
    {Betty
        <Tomcat7.exe, c8a57f4ca413effd5897d8a20e05fc80>,
        <iexplore.exe, 0685765c0cbe095ba0c6c8790bae21ef>
    }
List B:
    {Chuck
        <iexplore.exe, 0685765c0cbe095ba0c6c8790bae21ef>
    }
```

Figure 5B:
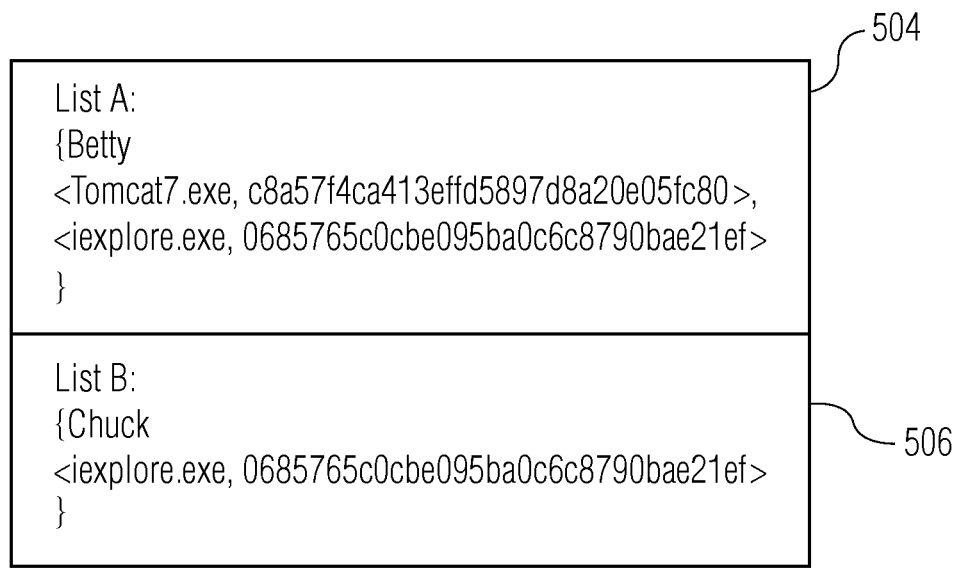
FIG. 5B depicts two different application whitelists in accordance with an embodiment of the invention.

The above-described whitelists are also depicted in FIG. 5B. Application whitelist A 504 can be distributed to application whitelisting services 1 and 2 (i.e., the application whitelisting services connected to the two VMs that Betty signed into while the application whitelist was being generated) and application whitelist B 506 can be distributed to application whitelisting service 3 (i.e., the application whitelisting service connected to the VM that Chuck signed into while the application whitelist was being generated.) Thus, when Betty signs in to VM 1 or VM 2 she will be permitted to execute Tomcat 7 or Internet Explorer, but if she signs in to VM 3 she will not be permitted to execute any applications. Similarly, if application whitelist B is distributed to application whitelisting service 3, Chuck will be able to execute Internet Explorer on VM3, but will not be able to execute any applications on VM1 or VM2.

In a further embodiment, entries can be added to a generated application whitelist despite requests corresponding to the entries not occurring while the application whitelist was being generated. The entries can be added, for example, manually by an admin or automatically according to predefined policies. For example, although Betty and Chuck were the only users to request to execute applications while the application whitelist was being generated, an administrator can decide that additional requests should be included in the application whitelist to generate the following application whitelist:

```
{Able
    <Tomcat7.exe, c8a57f4ca413effd5897d8a20e05fc80>
}
{Betty
    <Tomcat7.exe, c8a57f4ca413effd5897d8a20e05fc80>,
    <iexplore.exe, 0685765c0cbe095ba0c6c8790bae21ef>
}
{Chuck
    <iexplore.exe, 0685765c0cbe095ba0c6c8790bae21ef>
}
```

If the above-identified application whitelist is distributed to the application whitelisting services corresponding with VM 1, 2, and 3, then Able will be able to execute Tomcat 7 from VM 1, 2, or 3. Similarly, in a situation where different whitelists are distributed to each application whitelisting service, a similar practice can be used to generate the following application whitelists:

```
List A:
    {Betty
        <Tomcat7.exe, c8a57f4ca413effd5897d8a20e05fc80>,
        <iexplore.exe, 0685765c0cbe095ba0c6c8790bae21ef>
    }
List B:
    {Chuck
        <iexplore.exe, 0685765c0cbe095ba0c6c8790bae21ef>
    }
    {Betty
        <iexplore.exe, 0685765c0cbe095ba0c6c8790bae21ef>
    }
```

With application whitelist A distributed to the application whitelisting service associated with VM 1 and VM 2 and application whitelist B distributed to the application whitelisting service associated with VM 3, Betty will be permitted to execute Tomcat 7 or Internet Explorer from VM 1 and VM 2 as discussed above, but she will also be able to execute Internet Explorer from VM 3 despite not requesting to execute Internet Explorer when the application whitelist was being generated.

In an embodiment, the generation and enforcement of application whitelists can be broken down into two phases: a monitor phase and an enforcement phase.

Monitor Phase

In an embodiment of the monitor phase, an application whitelisting service monitors requests intercepted by thin agents and sends the requests along to a central controller without comparing the requests to an application whitelist. Also during this phase, applications are not blocked from executing. After a period of time (e.g., once enough requests have been collected), an application whitelist is generated manually by an administrator, automatically according to predefined policies, or by a combination of the two, and distributed to the one or more application whitelisting services in the virtual network.

Figure 6:
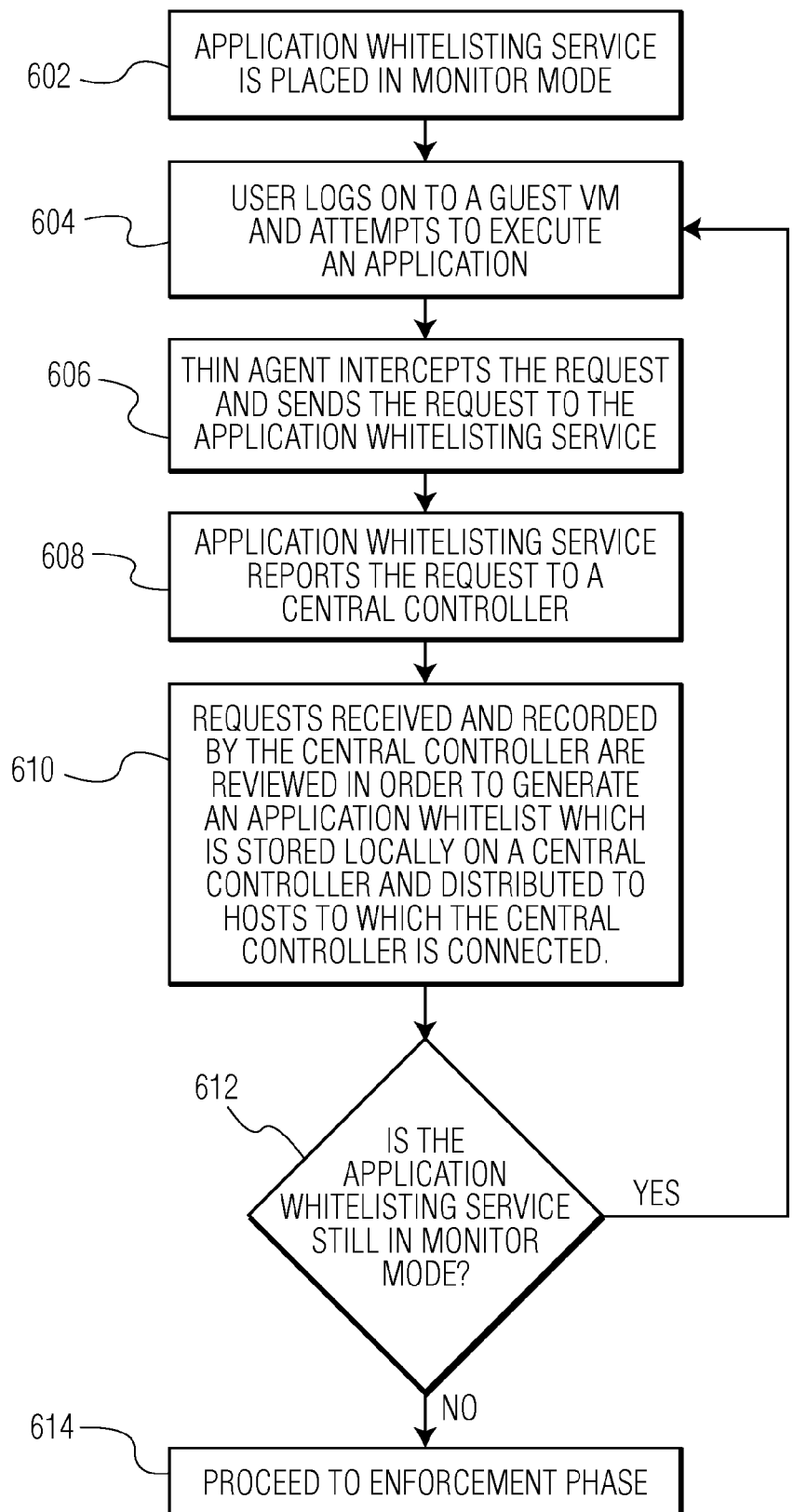
FIG. 6 is a process flow diagram of a technique for generating an application whitelist in accordance with an embodiment of the invention.

FIG. 6 is a process flow diagram of a technique for generating an application whitelist heuristically during the monitor phase. At block 602, an application whitelisting service running on a host is placed in monitor mode. In an embodiment, while in monitor mode, the application whitelisting service is passive and allows requested applications to be executed without comparing the requests to execute an application to an application whitelist. At block 604, a user logs onto a guest VM and attempts to execute an application. At block 606, the request is intercepted by a thin agent running on the guest VM and the request is sent to the application whitelisting service. At block 608, the application whitelisting service reports the request (e.g., the application identifier and user identifier) to a central controller. Since the application whitelisting service is passive, the application is not blocked and is allowed to execute. That is, the application whitelisting service only records the request to learn what requests are made by VMs in the SDDC. At block 610, the requests that were received and recorded by the central controller are reviewed in order to generate an application whitelist. The application whitelist is then stored locally on a central controller and distributed to connected hosts. In an embodiment, the requests are evaluated manually by an administrator, automatically by the central controller in accordance with predefined policies, or by a combination of the two and the same application whitelist is distributed to all hosts to which the central controller is connected. In another embodiment, a different application whitelist is distributed to each host to which the central controller is connected. After execution of the application, at decision point 612, the application whitelisting service determines if the application whitelisting service is still in monitor mode. If the application whitelisting service is still in monitor mode, then the application whitelisting service loops back to block 604, where the application whitelisting service remains in a passive mode. While the application whitelisting service remains passive, the application whitelisting service continues to record requests and learn more about requests that are made by VMs in the VM network as indicated by blocks 604-610. Alternatively, if the application whitelisting service is no longer in monitor mode then, at block 614, the technique proceeds to the enforcement phase.

Enforcement Phase

Once application whitelists have been distributed, the enforcement phase can begin. In an embodiment of the enforcement phase, the application whitelisting services of each host compare information from intercepted requests with entries in the application whitelist. If a request matches an entry in the application whitelist, then the application whitelisting service returns a command to the thin agent of a VM allowing the requested application to execute. If a request does not match an entry in the application whitelist, then the application is not allowed to execute and an alarm may be sent to the central controller for review.

Figure 7:
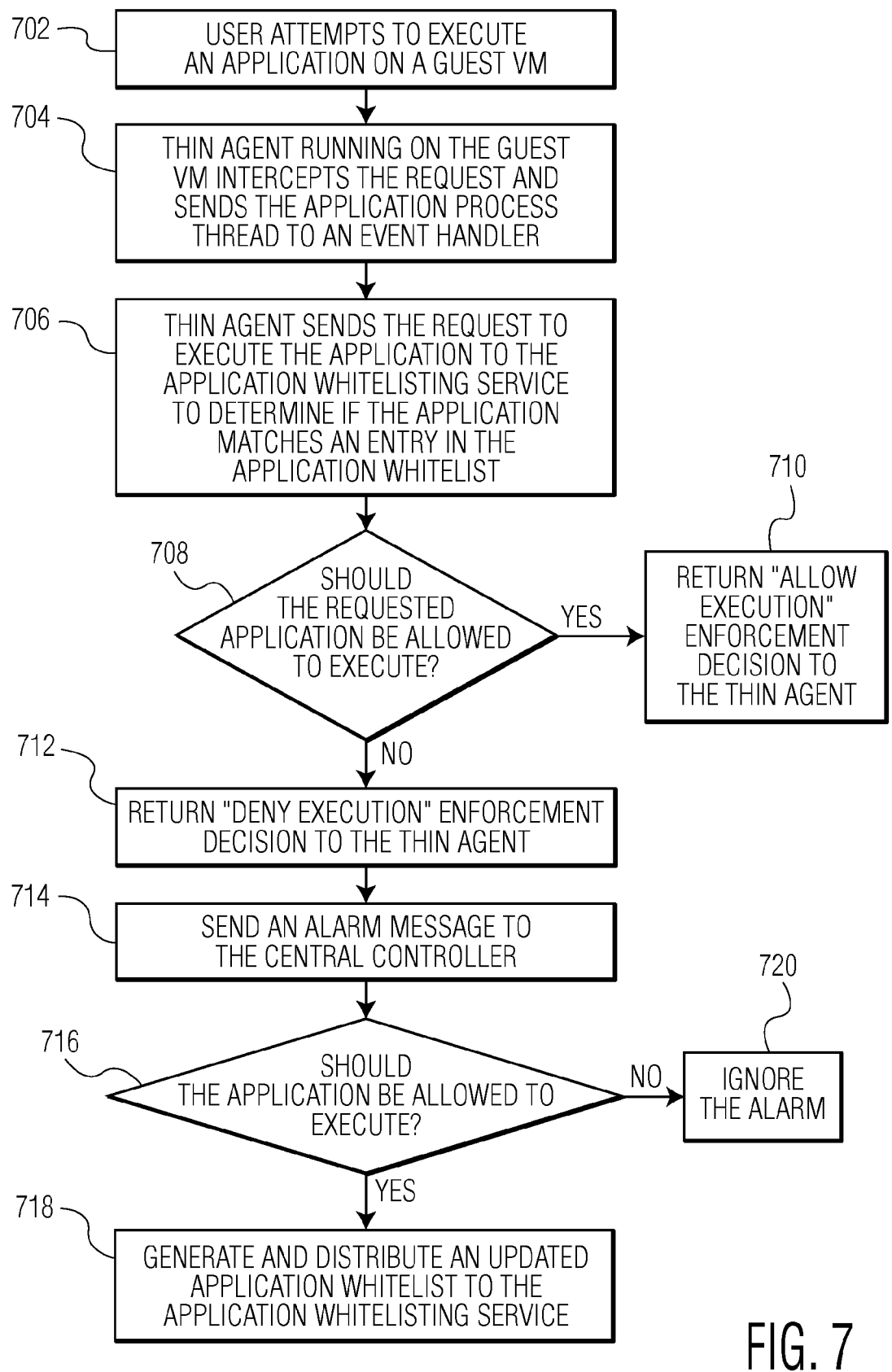
FIG. 7 is a process flow diagram of a technique for enforcing an application whitelist in accordance with an embodiment of the invention.

FIG. 7 is a process flow diagram of a technique for enforcing an application whitelist during the enforcement phase. At block 702, a user attempts to execute an application on a guest VM. At block 704, a thin agent running on the guest VM intercepts the request and sends the application process thread to an event handler, which blocks the thread. At block 706, the thin agent sends the request to execute the application to the application whitelisting service to determine if the requested application matches an entry in the application whitelist. At decision point 708, a determination is made as to whether the requested application should be allowed to execute. In an embodiment, the application whitelisting service determines if the requested application should be allowed to execute by searching for a matching entry in the application whitelist. In an alternate embodiment, the application whitelisting service determines if the requested application should be allowed to execute by utilizing a third-party application whitelist or service. At block 710, if the requested application should be allowed to execute, then the application whitelisting service returns an "allow execution" enforcement decision to the thin agent and the thin agent directs the event handler to allow the requested application to be executed. If the requested application should not be allowed to execute, then, at block 712, a "deny execution" enforcement decision is returned to the thin agent and the thin agent directs the event handler to terminate or block the execution of the requested application. At block 714, after the "deny execution" enforcement decision is returned to the thin agent, the application whitelisting service sends an alarm message to the central controller. In an embodiment, the alarm message includes the request to execute the application sent to the application whitelisting service by the thin agent. At decision point 716, a determination is made as to whether or not the requested application should be allowed to execute. In an embodiment, the determination is made by an administrator, automatically by the central controller according to predefined policies, or by a combination of the two. Typically, the determination to allow a requested application to execute will turn on factors such as, for example, the function of the application (e.g., internet browser or P2P torrent client), the amount of resources required by the application (e.g., 2 MB of memory or permission to write to system files), or the vulnerability of the application to hijack attempts (e.g., various versions of Internet Explorer). At block 718, if the requested application should be allowed to execute, then an updated application whitelist will be generated by the central controller and distributed to the application whitelisting services. Alternatively, at block 720, if the requested application should not be allowed to execute, then the alarm will be ignored and an updated application whitelist will not be distributed.

Although the operations of the method(s) herein are shown and described in a particular order, the order of the operations of each method may be altered so that certain operations may be performed in an inverse order or so that certain operations may be performed, at least in part, concurrently with other operations. In an embodiment, the monitor phase and the enforcement phase can occur concurrently. In another embodiment, instructions or sub-operations of distinct operations may be implemented in an intermittent and/or alternating manner.

It should also be noted that at least some of the operations for the methods may be implemented using software instructions stored on a computer useable storage medium for execution by a computer. As an example, an embodiment of a computer program product includes a computer useable storage medium to store a computer readable program that, when executed on a computer, causes the computer to perform operations, as described herein.

Furthermore, embodiments of at least portions of the invention can take the form of a computer program product accessible from a computer-usable or computer-readable medium providing program code for use by or in connection with a computer or any instruction execution system. For the purposes of this description, a computer-usable or computer readable medium can be any apparatus that can contain, store, communicate, propagate, or transport the program for use by or in connection with the instruction execution system, apparatus, or device.

The computer-useable or computer-readable medium can be an electronic, magnetic, optical, electromagnetic, infrared, or semiconductor system (or apparatus or device), or a propagation medium. Examples of a computer-readable medium include a semiconductor or solid state memory, magnetic tape, a removable computer diskette, a random access memory (RAM), a read-only memory (ROM), a rigid magnetic disc, and an optical disc. Current examples of optical discs include a compact disc with read only memory (CD-ROM), a compact disc with read/write (CD-R/W), a digital video disc (DVD), and a Blu-ray disc.

In the above description, specific details of various embodiments are provided. However, some embodiments may be practiced with less than all of these specific details. In other instances, certain methods, procedures, components, structures, and/or functions are described in no more detail than to enable the various embodiments of the invention, for the sake of brevity and clarity.

Although specific embodiments of the invention have been described and illustrated, the invention is not to be limited to the specific forms or arrangements of parts so described and illustrated. The scope of the invention is to be defined by the claims appended hereto and their equivalents.

What is claimed is:

1. A method for protecting a virtual machine network, the method comprising:
    storing an application whitelist specific to a hypervisor within the virtual machine network in memory of a host machine, wherein the application whitelist is used to determine whether applications are permitted to execute on each of a plurality of guest virtual machines executing on the host machine and the application whitelist includes application-to-user associations and is stored in memory that is inaccessible to requests of the plurality of guest virtual machines such that the application whitelist is immutable by a guest virtual machine of the plurality of guest virtual machines during a phase in which adherence to the application whitelist is enforced;
    receiving a request to execute an application on the guest virtual machine, the request being generated at the guest virtual machine responsive to intercepting, by the guest virtual machine, a user-generated request to execute the application on the guest virtual machine, wherein intercepting the user-generated request includes blocking execution of the application, and wherein the request to execute the application comprises an application identifier associated with the application and a user identifier associated with a user requesting execution of the application;
    comparing the application identifier and the user identifier of the request with the application whitelist; and
    generating an execution decision, wherein the execution decision indicates whether the application that was requested is allowed to execute on the guest virtual machine.

2. The method of claim 1, wherein the application identifier comprises at least one of an application file name and a hash value of the application.

3. The method of claim 1, wherein the user identifier comprises at least one of a user identifier (ID), a group ID, an Internet Protocol (IP) address, and workstation information of a user requesting the execution of the application.

4. The method of claim 1, wherein the request to execute an application further comprises an identifier (ID) associated with user access conditions.

5. The method of claim 1, wherein the application whitelist is generated by monitoring applications executed in virtual machines over a period of time.

6. The method of claim 1, wherein the application whitelist is generated by automatically adding at least one of files and applications needed by a trusted software updater to the application whitelist when the trusted software updater is added to the application whitelist.

7. The method of claim 1, wherein the request is received by an application whitelisting service and wherein the request is sent from an agent running on the guest virtual machine.

8. The method of claim 1, wherein the application whitelist comprises policies defining characteristics of applications.

9. A computer system comprising:
at least one host computing device, the at least one host computing device including at least one processor and memory for running instantiated virtual machines; and
a virtual machine management system configured to manage the virtual machines;
the at least one host computing device and the virtual machine management system being configured to:
store an application whitelist specific to a hypervisor within the virtual machine network in memory of a host machine, wherein the application whitelist is used to determine whether applications are permitted to execute on each of a plurality of guest virtual machines executing on the host machine and the application whitelist includes application-to-user associations and is stored in memory that is inaccessible to requests of the plurality of guest virtual machines such that the application whitelist is immutable by a guest virtual machine of the plurality of guest virtual machines during a phase in which adherence to the application whitelist is enforced;
receive a request to execute an application on the guest virtual machine, the request being generated at the guest virtual machine responsive to intercepting, by the guest virtual machine, a user-generated request to execute the application on the guest virtual machine, wherein intercepting the user-generated request includes blocking execution of the application, and wherein the request to execute the application comprises an application identifier associated with the application and a user identifier associated with a user requesting execution of the application;
compare the application identifier and the user identifier of the request with the application whitelist; and
generate an execution decision, wherein the execution decision indicates whether the application that was requested is allowed to execute on the guest virtual machine.

10. The computer system of claim 9, wherein the application identifier comprises at least one of an application file name and a hash value of the application.

11. The computer system of claim 9, wherein the user identifier comprises at least one of a user identifier (ID), a group ID, an Internet Protocol (IP) address, and workstation information of a user requesting the execution of the application.

12. The computer system of claim 9, wherein the request to execute an application further comprises an identifier (ID) associated with user access conditions.

13. The computer system of claim 9, wherein the application whitelist is generated by monitoring applications executed in virtual machines over a period of time.

14. The computer system of claim 9, wherein the application whitelist is generated by automatically adding at least one of files and applications needed by a trusted software updater to the application whitelist when the trusted software updater is added to the application whitelist.

15. The computer system of claim 9, wherein the request is received by an application whitelisting service and wherein the request is sent from an agent running on the guest virtual machine.

16. The computer system of claim 9, wherein the application whitelist comprises policies defining characteristics of applications.

17. A non-transitory computer-readable storage medium storing program instructions, wherein execution of the program instructions by one or more processors causes the one or more processors to perform steps comprising:
storing an application whitelist specific to a hypervisor within the virtual machine network in memory of a host machine, wherein the application whitelist is used to determine whether applications are permitted to execute on each of a plurality of guest virtual machines executing on the host machine and the application whitelist includes application-to-user associations and is stored in memory that is inaccessible to requests of the plurality of guest virtual machines such that the application whitelist is immutable by a guest virtual machine of the plurality of guest virtual machines during a phase in which adherence to the application whitelist is enforced;
receiving a request to execute an application on the guest virtual machine, the request being generated at the guest virtual machine responsive to intercepting, by the guest virtual machine, a user-generated request to execute the application on the guest virtual machine, wherein intercepting the user-generated request includes blocking execution of the application, and wherein the request to execute the application comprises an application identifier associated with the application and a user identifier associated with a user requesting execution of the application;
comparing the application identifier and the user identifier of the request with the application whitelist; and
generating an execution decision, wherein the execution decision indicates whether the application that was requested is allowed to execute on the guest virtual machine.

18. The non-transitory computer-readable storage medium of claim 17, wherein the application identifier comprises at least one of an application file name and a hash value of the application.

19. The non-transitory computer-readable storage medium of claim 17, wherein the user identifier comprises at least one of a user identifier (ID), a group ID, an Internet Protocol (IP) address, and workstation information of a user requesting the execution of the application.

20. The non-transitory computer-readable storage medium of claim 17, wherein the request to execute an application further comprises an identifier (ID) associated with user access conditions.

21. The non-transitory computer-readable storage medium of claim 17, wherein the application whitelist is generated by monitoring applications executed in virtual machines over a period of time.

22. The non-transitory computer-readable storage medium of claim 17, wherein the application whitelist is generated by automatically adding at least one of files and applications needed by a trusted software updater to the application whitelist when the trusted software updater is added to the application whitelist.

23. The non-transitory computer-readable storage medium of claim 17, wherein the request is received by an application whitelisting service and wherein the request is sent from an agent running on the guest virtual machine.

24. The non-transitory computer-readable storage medium of claim 17, wherein the application whitelist comprises policies defining characteristics of applications.

* * * * *